United States Patent [19]

Gebauer

[11] 4,312,382
[45] Jan. 26, 1982

[54] PRESSURE PEAK COMPENSATOR FOR PULSATING STREAMS OF LIQUID

[75] Inventor: Gerhard Gebauer, Bermatingen, Fed. Rep. of Germany

[73] Assignee: Firma J. Wagner GmbH, Fed. Rep. of Germany

[21] Appl. No.: 127,876

[22] Filed: Mar. 6, 1980

[30] Foreign Application Priority Data

Mar. 14, 1979 [DE] Fed. Rep. of Germany ....... 2910025

[51] Int. Cl.³ ............................................. F16L 55/04
[52] U.S. Cl. ...................................................... 138/30
[58] Field of Search ................. 138/26, 30; 220/85 B; 137/207

[56] References Cited

U.S. PATENT DOCUMENTS

| | | | |
|---|---|---|---|
| 2,246,621 | 6/1941 | Davis | 138/30 X |
| 2,290,337 | 7/1942 | Knauth | 138/30 |
| 2,540,676 | 2/1951 | Johnson et al. | 138/30 |
| 2,638,932 | 5/1953 | Alexander | 138/30 |
| 3,461,914 | 8/1969 | Sugimura et al. | 138/30 |
| 4,195,668 | 4/1980 | Lewis | 138/30 |

FOREIGN PATENT DOCUMENTS 2623950 12/1977 Fed. Rep. of Germany ........ 138/30

*Primary Examiner*—James E. Bryant, III
*Attorney, Agent, or Firm*—McGlew and Tuttle

[57] ABSTRACT

A pressure peak compensator for compensating the pressures of a pulsating stream of liquid in a liquid pressure line comprises first and second opposed accumulator portions each having a pressure chamber which is connectable to the liquid line. Each accumulator includes a diaphragm extending across the pressure chamber which has a first side away from the pressure chamber which is disposed in a respective gas chamber and an opposite second side exposed to the liquid pressure in the pressure chamber. The diaphragms are movable between two end positions and in each end position the housing includes backing plates for backing the diaphragm along its contour in its end position. The respective gas chambers may be made of the same or different volumes and one or more of these chambers and diaphragms may be provided in each of the accumulator portions. The accumulator portions advantageously comprise housing parts which are connected together over an intermediate housing part containing the connection for the fluid pressure line.

12 Claims, 3 Drawing Figures

PRESSURE PEAK COMPENSATOR FOR PULSATING STREAMS OF LIQUID

FIELD AND BACKGROUND OF THE INVENTION

This invention relates in general to fluid control devices and in particular to a new and useful pressure peak compensator for connection to a pressure liquid line.

Gas dampers to compensate for fluid pressure peaks are known and have proved satisfactory in practice. Such a pressure accumulator connectable to a pressure line conducting liquid is disclosed in German OS No. 2,623,950, for example.

The damping volume of these prior art pressure-peak compensators, however, is small since a small diaphragm amplitude and small diaphragm diameter must be provided to avoid overstressing of the diaphragms and the housing parts. The also known bag or piston accumulators, where the fluid to be conveyed is separated from an opposite spring element, such as a gas cushion, by a bag or a piston, do have a larger damping volume than an accumulator with a fixed diaphragm, however, they either cannot be used for paints or similar abrasive or aggressive liquids; since the material of a bag is not sufficiently resistant, or cannot damp streams with a pulsation below 5 Hz, since a piston is too sluggish in response.

SUMMARY OF THE INVENTION

The invention is directed to a pressure peaks compensator for pulsating streams of liquid equipped with a diaphragm of resistant material provided between the gas chamber and the pressure chamber, which has a large damping volume and is usable over a wide pressure range without overstressing the component parts, so as to obtain an extensive range of application. At the same time, the construction is to be inexpensive to ensure economy in manufacture.

In accordance with the invention the pressure peak compensator for connection to a pressure liquid line comprises first and second accumulator portions each of which has a pressure chamber which is connectable to the liquid line and each of which carries a diaphragm which extends across the chamber and has one side exposed to the pressure of the chamber and an opposite side exposed to the pressure in a gas chamber of the associated accumulator. The two accumulators are advantageously joined together in a housing assembly which includes an intermediate housing part and an accumulator housing part on each side of the intermediate housing part all of which are assembled together and secured together by bolts. The accumulators may comprise only a single gas chamber and a single diaphragm or may carry a plurality of the diaphragms operated so that the diaphragms shift in respect to changes in pressure and equalize the pressure variations. The gas chambers may be of the same or different sizes and the pressures of the gases in the chambers may be varied as desired to achieve the desired results.

The gas chambers of the two gas accumulators may have equal or unequal volumes and may be pre-pressurized with equal or different pressures. With equal volumes and initial pressures, the damping volume is doubled, with unequal initial pressures, the pressure range is extended. Further, if the volume of each gas chamber is proportional to a definite pressure range and the volumes are different and differently pre-pressurized, two pressure ranges can be exactly covered with a single pressure peaks compensator.

Pressure peaks compensators designed according to the invention may also be assembled in a cascade arrangement, so that the damping volume can easily further be enlarged.

The inventive pressure peaks compensator for pulsating streams of liquid is not only very simple in design and, consequently, inexpensive to manufacture, but also is very reliable in operation and has a large damping volume resulting in a wide range of application. That is, if a second diaphragm-equipped pressure accumulator is provided in mirror image arrangement relative to the component parts of the first pressure accumulator, a pressure peaks compensator is obtained which is insensitive to abrasion or aggressive fluids and which component parts are only lightly strained, due to the small diameter of the diaphragms. Nevertheless, the damping volume can be doubled or the pressure range in which the pressure peaks compensator is effective can be made large. Since only a few component parts are needed, the inventive pressure peaks compensator which, in addition, is quick in response, in insensitive to disturbances, handy, and requires only little space.

Accordingly it is an object of the invention to provide a pressure peak compensator for connection to a pressure liquid line which comprises first and second accumulator parts having respective first and second pressure chambers which are connectable to the liquid line and which also carry respective first and second diaphragms which extend across the pressure chambers and have one side exposed to the pressure of the liquid line in an opposite side exposed to the pressure in a respective first and second gas chamber of the associated accumulator, the diaphragms being movable in response to pressure variations in order to dampen the pressure peaks and compensate therefor.

A further object of the invention is to provide a pressure peak accumulator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
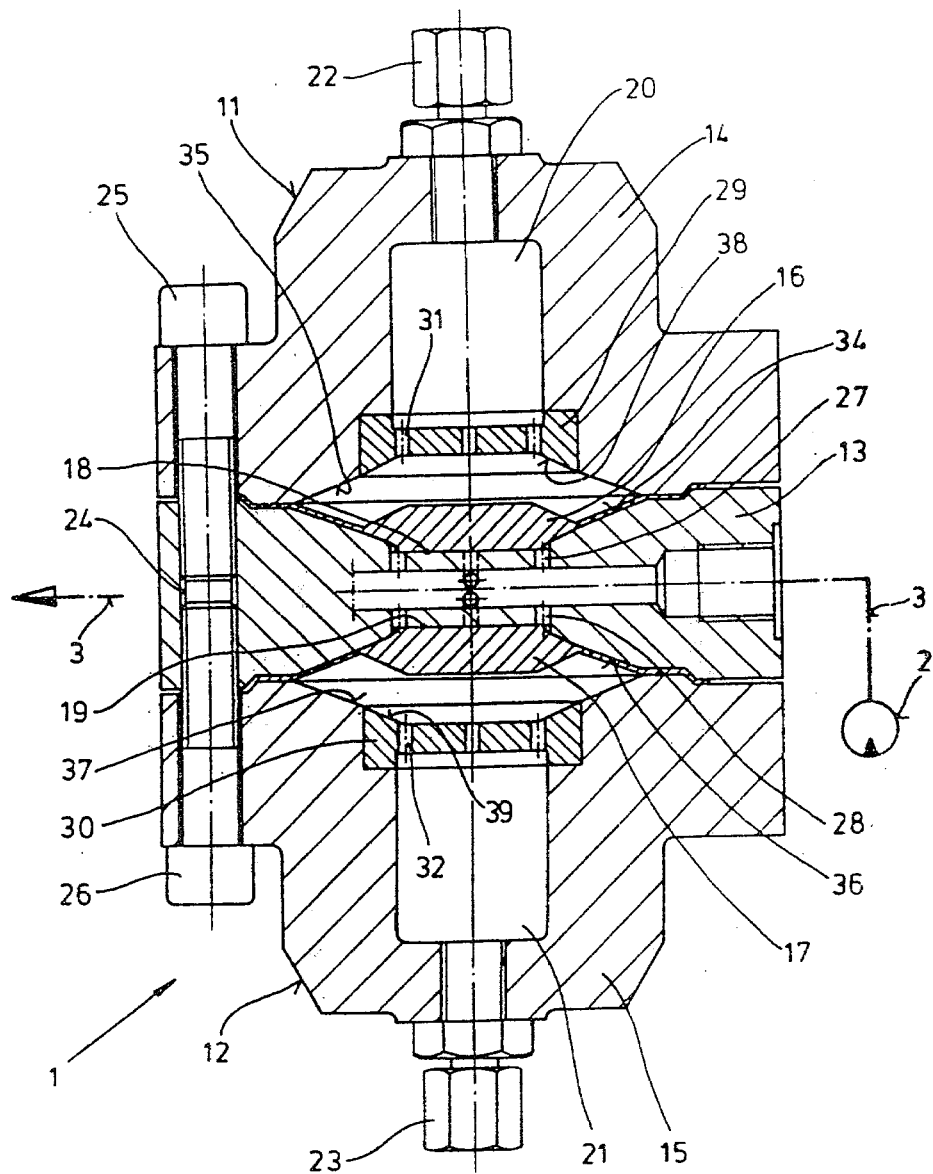
FIG. 1 is an axial sectional view of a pressure peak compensator formed of two pressure accumulators and constructed in accordance with the invention.

Referring to the drawings in particular, the invention embodied therein in FIG. 1 comprises a pressure peak compensator for connection to a pressure liquid line 3 which comprises a first accumulator portion 11 which is assembled with a second accumulator portion 12 on respective sides of an intermediate housing part or middle part 13. Each accumulator is adapted to be connection to the separate pressure line through a pressure chamber 18 and 19 respectively and each accumulator carries a respective diaphragm having one side exposed to this fluid pressure and an opposite side exposed to the fluid pressure of a gas chamber 20 or 21 of the respective accumulator.

The pressure peaks compensator shown in FIG. 1 and generally designated 1 is connected to a liquid line or pressure conduit 3 of a liquid pump 2 and serves the purpose of equilibrating pressure peaks produced in the stream of liquid. To this end, a first pressure accumulator portion 11 and, in mirror image relationship therewith, a second pressure accumulator portion 12 are provided which include a respective pressure chamber 18 and 19 and a respective gas chamber 20, 21, the two chambers being separated from each other by a respective diaphragm 16, 17.

Diaphragms 16 and 17 are each fixed between an intermediate plate-shaped housing part 13 and respective dome-shaped housing parts 14 or 15. The housing parts 13, 14 and 15 are firmly secured to each other by screws 25, 26 screwed into tap holes 24 of housing part 13. Gas chambers 20 and 21, which are designed for being filled with a pressure gas, such as nitrogen, and provided each with a fill-up valve 22, 23 have equal volumes but may be pressurized either equally or differently. Pressure chambers 18 and 19 communicate with pressure conduit 3 through respective passages 27 and 28. To back up diaphragms 16 and 17 in their end positions into which they are forced by the pressure peaks, backing discs 29, 30 are inserted in housing parts 14, 15. The discs 29 and 30 are also provided with respective passages 31 and 32 to allow the pressurized gas to act on the diaphragms 16, 17. In the area where the diaphragms 16 and 17 are not fixed, the contact surfaces 34, 36 of housing part 13 as well as the contact surfaces 35, 37 of housing parts 13 and 15 and contact surfaces 38, 39 of backing discs 29, 30 are frusto-conical or concavely curved, so as to back up diaphragms 16 and 17 in accordance with their maximum allowable flexure.

If a pressure peak appears in pressure conduit 3, it is compensated by pressure peaks compensator 1. That is, as soon as the pressure in conduit 3 exceeds the pressure present in gas chambers 20, 21, the gas cushion is compressed, since diaphragms 16 and/or 17, depending on whether gas chambers 20 and 21 are pressurized equally or differently, are lifted by the pressure liquid from contact surfaces 34, 36 and may be deflected up to a contact with housing parts 14, 15 and backing discs 29, 30. The pressure in the gas chambers 20 and 21 is thereby increased, however, with the decrease of the pressure peak, the accumulated energy is transferred to the pressure liquid again so that in this way the pressure variations are equalized.

Since pressure peaks compensator 1 comprises two pressure accumulators or accumulator portions 11 and 12, its damping volume is large. In spite of that, the compensator assembled of only a small number of parts occupies a small space and it can advantageously be used also for paints, dye liquids, solvents and similar liquids, since the diaphragms may be made of a material resistant to aggressive fluids, for example of a polyamide.

Figure 2:
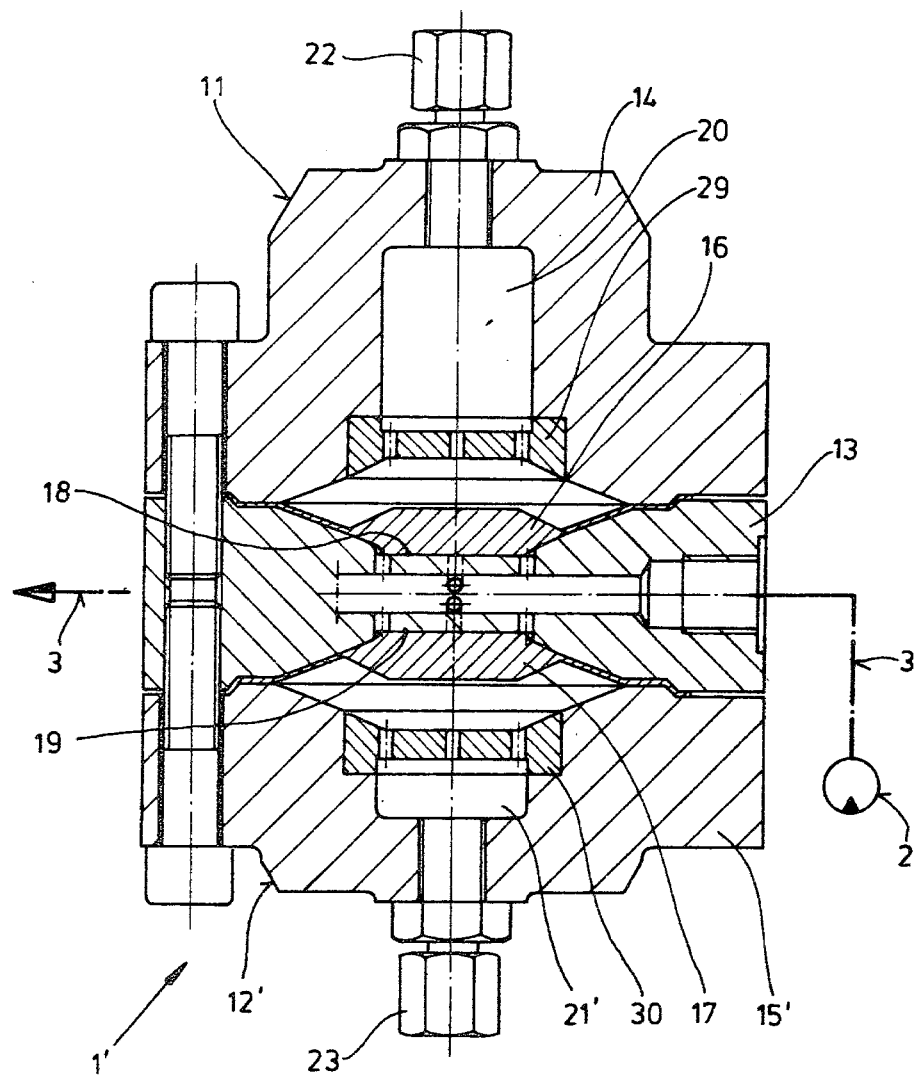
FIG. 2 is a view similar to FIG. 1 of another embodiment of the invention.

In the embodiment of FIG. 2 similar parts are similarly designated but with a prime in respect to those parts of FIG. 1 and the gas chambers 20' and 21' of the two pressure accumulators or accumulator parts 11' and 12' forming pressure peaks compensator 1 have different volumes and are each proportioned to a definite pressure range. For example, the pressure in gas chamber 20' is 90 bar and the volume of the chamber is such that at the pressure of 250 bar, diaphragm 16' applies against housing part 14' and backing disc 29', while the pressure in gas chamber 21' may be 250 bar and the volume of the chamber is such that diaphragm 17' applies to housing part 15' and backing disc 30 only if the pressure in conduit 3' rises to 500 bar. In this way, a large range of pressures to be damped is covered, pressure accumulator 11' covering the range between 90 and 250 bar and pressure accumulator 12' covering the range of 250 to 500 bar.

Figure 3:
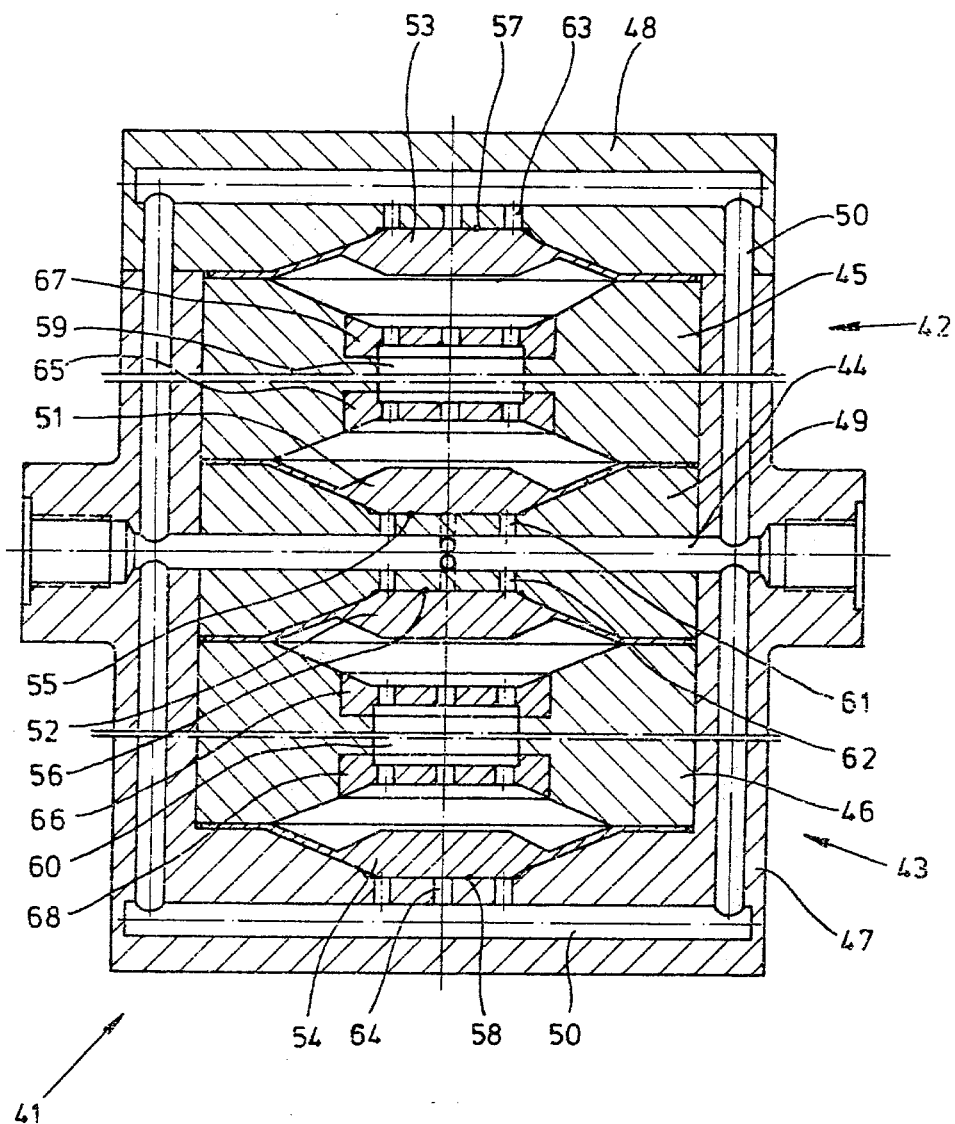
FIG. 3 is a view similar to FIG. 1 of still another embodiment of the invention.

In the pressure peaks compensator 41 according to FIG. 3, again two pressure accumulators or accumulator parts 42 and 43 are provided comprising each two pressure chambers 55, 57 and 56, 58, but they are associated with a single gas chamber 59, 60 which is separated from the pressure chambers by diaphragms 51, 53 and 50 to 54. Diaphragms 51, 52, 53, 54 are inserted between housing parts 44, 45, 46, 47 and 48 and firmly fixed, with housing part 47 serving as a shell and housing part 48 serving as a firmly secured cover of the assembly.

The pressure conduit 49 worked in housing part 44 and 47 communicates with pressure chambers 55 and 56 through passages 61 and 62, and pressure chambers 57, 58 are supplied with the pressure fluid through a branch conduit 50 provided in housing part 47, and through passages 63 and 64. To back up diaphragms 51, 52, 53, 54 in their end positions at pressure peaks, again backing discs 65, 66, 67 and 68 are provided which are inserted in housing parts 45 and 46.

Compensator 41 operates in the same way and has almost the same overall dimensions as that of the embodiment of FIGS. 1 and 2, however its damping volume is doubled. That is, every pressure peak in pressure conduit 49 acts on and deflects simultaneously two diaphragms so that in spite of the extremely rugged construction, a large volume is available for compensating the pressure variations.

While specific embodiments of the invention have been shown and described in detail to illustrate the application of the principles of the invention, it will be understood that the invention may be embodied otherwise without departing from such principles.

What is claimed is:

1. A pressure peak compensator for connection to a pressure liquid line, comprising first and second accumulators each having a respective first and second pressure chamber connectable to the liquid line, respective first and second diaphragms extending transversely across said respective first and second pressure chambers and each having a first side and an opposite second side exposed to the liquid pressure in said pressure chamber, each of said diaphragms being movable between two end positions upon variation in pressure in said respective pressure chambers, each of said first and second accumulators having a gas chamber defined therein exposed to said first side of the associated first and second diaphragms, backing means in each accumulator for backing substantially the entire area of each of said diaphragms in each of their end positions, said first and second diaphragms being movable in response to variations in pressure in the pressure liquid line to compensate for peak pressures therein.

2. A pressure peaks compensator according to claim 1, wherein said first and second accumulators each comprise an accumulator portion of a single housing assembly, said housing assembly including respective first and second accumulator housing portions, and an intermediate housing portion disposed between said first and second accumulator housing portions and clamping means clamping said first and second housing portions to said intermediate housing portion.

3. A pressure peaks compensator according to claim 1 including an intermediate housing portion, a respective first and second accumulator housing portion arranged on each side of said intermediate housing portion, said first and second diaphragms being held between the intermediate housing portion and a respective first and second accumulator housing portion, said accumulator housing portions being of dome-shaped configuration and having a hollow therein defining said respective first and second pressure chambers, said intermediate housing portion having a conduit extending through at least a portion thereof for the pressure liquid defining said pressure chamber.

4. A pressure peaks accumulator according to claim 1, wherein each of said gas chambers have identical volumes, and means for pressurizing said gas chambers to a selected pressure.

5. A pressure peaks accumulator according to claim 4, wherein said gas chambers are pressurized to unequal pressures.

6. A pressure peaks accumulator according to claim 1, wherein said pressure chambers of the respective first and second accumulators are of unequal size.

7. A pressure peaks compensator according to claim 1, wherein said first and second accumulators include an intermediate housing portion and a respective first and second accumulator housing portion on each side of said intermediate housing portion, said diaphragm being confined between said intermediate housing portion and a respective one of said first and second diaphragm housing portions, means for clamping said housing portions together, said first accumulator housing portion being a mirror image of said second accumulator housing portion, said backing means in said accumulator comprising a plate arranged in the path of movement of the respective first and second diaphragm forming a backing for said diaphragm in an end position.

8. A pressure peaks compensator according to claim 1, wherein there are a plurality of pressure chambers in each of said accumulators, each of said pressure chambers being separated from the associated adjacent pressure chamber by a diaphragm.

9. A pressure peaks compensator according to claim 1, wherein said backing means comprises a backing disc arranged on respective sides of said diaphragms.

10. A pressure peaks compensator according to claim 9, wherein said diaphragm has a central area which is not fixed and wherein said backing disc has frusto-conically curved surfaces, said diaphragms having similarly curved surfaces engageable with the surfaces of said backing disc.

11. A pressure peaks compensator according to claim 10, including a plurality of pressure chambers formed in each of said accumulators each being separated from the next adjacent pressure chamber by a disc member having a passage therethrough.

12. A pressure peak compensator comprising:
an intermediate housing portion having a liquid supply conduit defined therein and opposite frusto-conical concave backing surfaces defined on opposite sides thereof, said opposite frusto-conical surfaces having a central flat area and a peripheral inclined area and said intermediate housing having passages therein defined from said liquid supply conduit through said flat areas;
a pair of end housing portions connected to said intermediate housing portion on either side of said intermediate housing portion, each end housing portion having a further fructo-conical backing surface facing a respective opposite backing surface of said intermediate housing and defining with each respective opposite backing surface a pressure chamber, each further backing surface having a central flat area and a peripheral inclined area, each end housing portion having a gas chamber therein with a passage defined therethrough communicating each gas chamber with each pressure chamber and extending through each further central flat area; and
a diaphragm extending across each pressure chamber separating each opposite backing surface from each further backing surface, each diaphragm movable between first and second positions by a pressure differential between said liquid supply conduit and a respective gas chamber, each diaphragm having opposite surface areas, each diaphragm in its first position being supported along substantially all of one of its surface areas on a respective opposite backing surface and, in its second position, along substantially its entire opposite surface area along a respective further backing surface, and each diaphragm having a central fixed portion movable against a respective first-mentioned and further central flat area and a thin peripheral portion movable against a respective first-mentioned and further peripheral inclined area.

* * * * *